(No Model.)

W. CASSILL.
CORN PLANTER AND FERTILIZER DISTRIBUTER.

No. 252,736. Patented Jan. 24, 1882.

WITNESSES:
Theo. J. Hoster
C. Sedgwick

INVENTOR:
W. Cassill
BY Munn & Co
ATTORNEYS.

UNITED STATES PATENT OFFICE.

WILLIAM CASSILL, OF HAMDEN JUNCTION, ASSIGNOR TO HIMSELF AND JOHN T. OGIER, OF HAMDEN, OHIO.

CORN-PLANTER AND FERTILIZER-DISTRIBUTER.

SPECIFICATION forming part of Letters Patent No. 252,736, dated January 24, 1882.

Application filed September 5, 1881. (No model.)

*To all whom it may concern:*

Be it known that I, WILLIAM CASSILL, of Hamden Junction, in the county of Vinton and State of Ohio, have invented a new and useful Improvement in Combined Corn-Planter and Fertilizer-Distributer, of which the following is a full, clear, and exact description, reference being had to the accompanying drawings, forming part of this specification, in which similar letters of reference indicate corresponding parts in all the figures.

Figure 1:
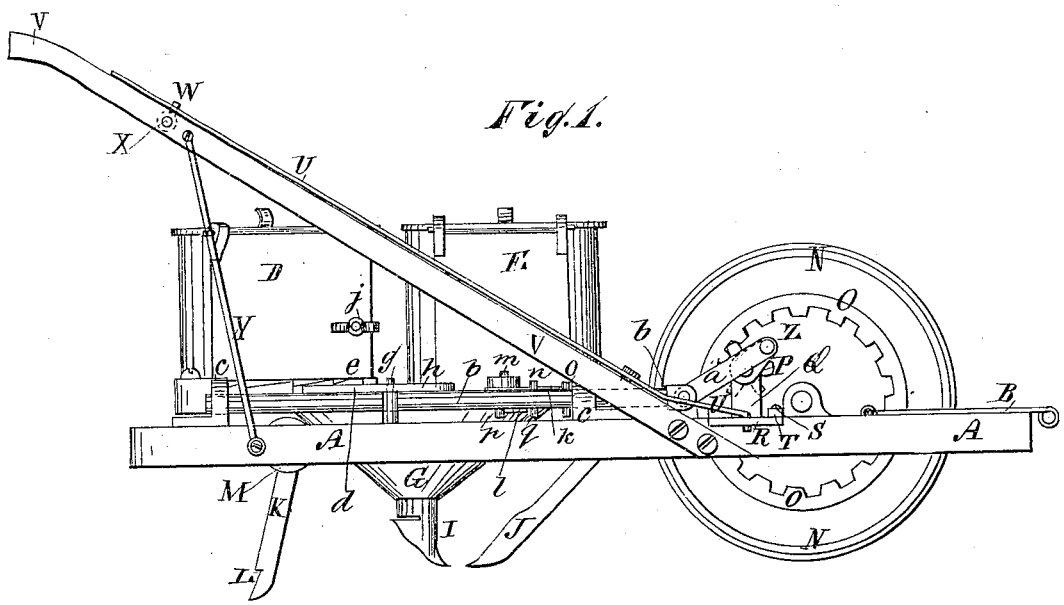
Figure 2:
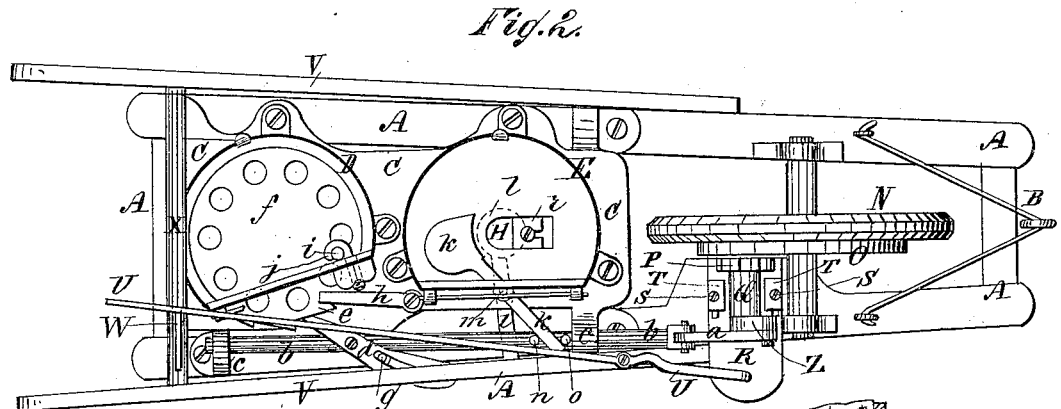
Figure 3:
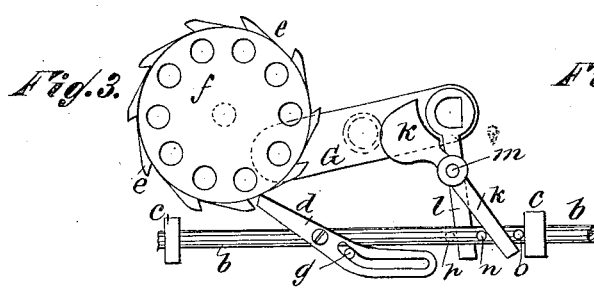
Figure 4:
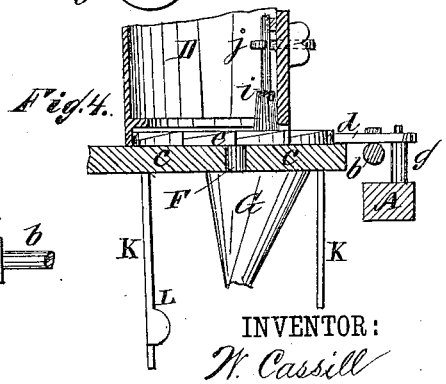
Figure 5:
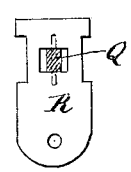

Figure 1 is a side elevation of my improvement. Fig. 2 is a plan view of the same, shown with the covers raised. Fig. 3 is a plan view of a part of the corn-dropping and fertilizer-distributing mechanism. Fig. 4 is a sectional end elevation taken through the seed-hopper. Fig. 5 is a plan view of the gear-wheel slide, showing the tenon of the gear-wheel standard in section.

The object of this invention is to facilitate the simultaneous dropping of corn and distribution of fertilizers.

A is the frame of the machine, to the forward part of which the draft is applied by means of a bail, B, or other suitable means. To the rear part of the frame A is attached a platform, C. To the rear part of the platform C is attached the corn-hopper D, and to the forward part of the said platform is attached the fertilizer-hopper E. In the platform C, beneath the forward right-hand part of the hopper D, is formed an aperture, F, through which the seed passes to the discharge-spout G, and in the platform C, beneath the middle part of the fertilizer-hopper E, is formed an aperture, H, through which the fertilizer passes to the discharge-spout G. The amount of fertilizer dropped at a time is regulated by a plate, *r*, the inner part of which is bent downward to fit into the discharge-hole H, so that the size of the said hole can be regulated by moving the said plate in and out. The outer part of the plate *r* is slotted to receive the fastening-screw, as shown in Fig. 2.

The discharge-spout G is made with its upper part in the shape of a flattened funnel, and is attached to the lower side of the platform C in an inclined or diagonal position, as shown in Fig. 3, so as to receive both the seed and the fertilizer as they drop from the apertures F H and conduct them to the same spot in the furrow opened by the plow I, attached to the lower end of the said spout G.

To the forward part of the platform C, or to the frame A, is attached a colter, J, which inclines to the rearward and enters the ground a little in front of the opening-plow I, to cut roots, sods, and other obstructions that might interfere with the proper operation of the said opening-plow I.

K are standards which are made with sharp forward edges, similar to colters, and have inwardly-projecting flanges or wings L upon their rear edges, to throw soil into the open furrow and cover the seed and fertilizer.

The flanges or wings L can be formed upon the standards K, or they can be formed separate and secured to the said standards by bolts, rivets, or other suitable means. The upper ends of the standards K are secured to the side bars of the frame A by eyebolts or other suitable clamps, blocks M being interposed between the said standards and side bars to bring the plows into the proper position to cover the seed. With this construction, by loosening the clamping-bolts the plow-standards can be adjusted at any desired pitch.

The forward end of the machine is supported by the drive-wheel N, the journals of which work in bearings attached to the side bars of the frame A. To the drive-wheel N is attached an internally-toothed gear-wheel, O, into the teeth of which mesh the teeth of a small gear-wheel, P, journaled to a short stud, Q. The lower end of the stud Q, or a tenon formed upon the said lower end, passes through a cross-slot formed in the inner part of the slide R, so that the said stud Q can be adjusted to allow a larger or smaller gear-wheel, P, to be used, according as it is desired to drop the seed farther apart or closer together. The slide R is placed in a recess in the upper side of a side bar of the frame A, and its movements are limited by bolts S, which pass through the said side bar, through slots or recesses in the said slide, and through washers T, placed upon the said bolts to cover the slots or recesses in the said slide. With this construction, by moving the slide out and in the gear-wheel P can be thrown out of and into gear with the gear-wheel O to stop and start the seed-dropping mechanism.

The slide R is operated by the lever U, the lower end of which is pivoted to the outer end of the said slide. The lever U passes up along one of the handles V and engages with a catch, W, attached to the round X, that connects the upper parts of the said handles. The forward ends of the handles V are attached to the side bars of the frame A, and the said handles are supported at the proper elevation by the brace-bars Y, attached to them and to the side bars of the frame A.

To the journal of the gear-wheel P, at the outer side of the stud Q, is attached a short crank, Z, to the crank-pin of which is pivoted the end of a short connecting-rod, $a$. The other end of the connecting-rod $a$ is pivoted to the end of a bar or rod, $b$, that slides in bearings $c$, attached to the side bar of the frame A, so that the bar $b$ will be moved forward and back by the revolution of the crank Z.

To the rear part of the sliding rod $b$ is pivoted a pawl, $d$, which engages with the ratchet-wheel $e$, formed upon or attached to the disk $f$. The disk $f$ forms the bottom of the hopper D, is pivoted at its center to the platform C, and has a circle of holes formed in it to receive seed from the said hopper and drop it through the hole F in the said platform as the said holes come successively over the said hole F. The outer part of the pawl $d$ projects beyond its pivot, is bent inward slightly at a point a little beyond the said pivot, and is slotted longitudinally, the inner end of the said slot being inclined inward, as shown in Fig. 3.

To the side bar of the frame A is attached a stud, $g$, the upper end of which, or a pin or round tenon attached to or formed upon the said upper end, passes through the slot in the outer part of the pawl $d$, to cause the forward end of the said pawl to move inward at the proper time to engage with the teeth of the ratchet-wheel $e$. The teeth of the ratchet-wheel $e$ rise above the upper surface of the disk $f$, so that the spring-pawl $h$ can engage with them, and hold the ratchet-wheel $e$ from being turned back by the friction of the pawl $d$ as it is being drawn back for another stroke. The holding-pawl $h$ is attached to the platform C in such a position that the inner end of the said pawl $h$ will project over the disk $f$ so far as to overlap or partially overlap the seed-receiving holes of the said disk and push out any kernels that may become lodged in the said holes. The seed-dropping disk $f$ is kept from carrying out any more grain than enough to fill its seed-dropping holes by the cut-off brush $i$, secured to the inner surface of the wall of the hopper D by a clamping-bolt, $j$, so that the said brush can be adjusted by loosening the nut of the said clamping-bolt.

$k$ $l$ are two cut-off slides, which are placed one above and the other below the platform C, so as to close the discharge-hole H at the upper and lower sides of the said platform. The shanks of the slides $k$ $l$ are pivoted to the platform C by a single pin, $m$. The shank of the upper slide, $k$, crosses the upper side of the sliding rod $b$ and passes between two pins, $n$ $o$, attached to the said rod $b$. The shank of the lower slide, $l$, crosses the lower side of the sliding rod $b$ and passes between two pins, $p$ $q$, placed a little in the rear of the pins $n$ $o$, and the forward one, $q$, of which may be the downwardly-projecting end of the rear upper pin, $n$. With this construction, when the sliding rod $b$ is at the forward end of its stroke the slide $l$ will be directly beneath the aperture H and the upper slide, $k$, will be in the rear of the said aperture, as shown in Fig. 2, so that the fertilizer will pass into and fill the said aperture H. As the sliding rod $b$ moves to the rearward the upper slide, $k$, moves forward and covers the upper end of the aperture H and the lower slide, $l$, moves forward and uncovers the lower end of the said aperture H, allowing the fertilizer to pass to the ground through the spout G. As the sliding rod $b$ again moves forward the slides $k$ $l$ return to the position shown in Fig. 2.

Having thus described my invention, I claim as new and desire to secure by Letters Patent—

1. In a combined corn-planter and fertilizer-distributer, the combination, with the frame A, platform C, hoppers D E, and drive-wheel N, of the gear-wheels O P, the crank and pitman Z $a$, the sliding rod $b$, the pair of pivoted slides $k$ $l$, the pawls $d$, and the ratchet-wheel $e$, attached to the disk $f$, substantially as herein shown and described, whereby the fertilizer will be distributed and the seed dropped by the advance of the machine, as set forth.

2. In a combined corn-planter and fertilizer-distributer, the combination, with the frame A, the sliding rod $b$, and the pawl $d$, having a slot in its extended outer end, of the stationary stud $g$, substantially as herein shown and described, whereby the movements of the said pawl are controlled, as set forth.

3. In a combined corn-planter and fertilizer-distributer, the combination, with the pair of pivoted slides $k$ $l$ and the sliding rod $b$, of the pins $n$ $o$ and $p$ $q$, substantially as herein shown and described, whereby the said slides will be operated to cut off and drop the fertilizer, as set forth.

WILLIAM CASSILL.

Witnesses:
J. T. BARRETT,
J. B. WATTS.